United States Patent
Pond et al.

[19]

[11] Patent Number: 5,934,749
[45] Date of Patent: Aug. 10, 1999

[54] VEHICLE SEAT WITH REMOVABLE BOLSTERS AND PIVOTING HEADREST MEMBERS

[75] Inventors: George M. Pond, Wisconsin Dells; Eric Sauey, Reedsburg, both of Wis.

[73] Assignee: Seats, Inc., Reedsburg, Wis.

[21] Appl. No.: 09/052,330

[22] Filed: Mar. 31, 1998

[51] Int. Cl.⁶ .................................................. A47C 7/62
[52] U.S. Cl. .................. 297/188.04; 297/217.1; 297/219.1; 297/284.1; 297/284.5; 297/284.9; 297/DIG. 6; 297/483; 297/484; 297/391; 297/406
[58] Field of Search .................. 297/188.01, 188.04, 297/188.05, 188.06, 188.07, 217.1, 217.5, 219.1, 284.1, 284.5, 284.9, DIG. 6, 483, 484, 391, 406, 486

[56] References Cited

U.S. PATENT DOCUMENTS

| | | | |
|---|---|---|---|
| D. 352,612 | 11/1994 | Pond et al. | D6/356 |
| D. 390,367 | 2/1998 | Demski et al. | D6/356 |
| 2,633,905 | 4/1953 | Geldbaugh | 155/188 |
| 2,719,577 | 10/1955 | Eyman | 297/391 |
| 3,204,775 | 9/1965 | Smith et al. | 211/75 |
| 3,466,091 | 9/1969 | Grusso | 297/390 |
| 3,547,391 | 12/1970 | Johnson | 248/311 |
| 3,667,714 | 6/1972 | Ziaylek, Jr. | 248/284 |
| 3,823,907 | 7/1974 | Ziaylek, Jr. | 248/313 |
| 3,971,591 | 7/1976 | Ziaylek | 297/188.04 |
| 4,431,206 | 2/1984 | Pryor | 280/289 |
| 4,466,662 | 8/1984 | McDonald et al. | 297/406 |
| 4,730,875 | 3/1988 | Yoshitsugu | 297/483 X |
| 4,848,714 | 7/1989 | Ziaylek, Jr. et al. | 248/313 |
| 5,018,790 | 5/1991 | Jay | 297/DIG. 6 X |
| 5,213,392 | 5/1993 | Bostrom et al. | 297/217.1 |
| 5,263,741 | 11/1993 | Seros et al. | 297/483 X |
| 5,275,462 | 1/1994 | Pond et al. | 297/188.04 |
| 5,310,245 | 5/1994 | Lyszczasz | 297/DIG. 6 X |
| 5,314,233 | 5/1994 | Bostrom et al. | 297/217.1 |
| 5,354,029 | 10/1994 | Ziaylek, Jr. et al. | 248/188.04 X |
| 5,378,045 | 1/1995 | Siekman et al. | 297/DIG. 6 X |
| 5,533,787 | 7/1996 | Xiang | 297/DIG. 6 X |
| 5,586,810 | 12/1996 | Liu | 297/406 |
| 5,681,080 | 10/1997 | Pond et al. | 297/188.05 |
| 5,803,544 | 9/1998 | Block et al. | 297/188.04 X |

OTHER PUBLICATIONS

Brochure Titled "911 Series" by Seats Incorporated—Bulletin No. 16–185 (Mar. 1991).
Brochure by Zico Ziamatic Corp., pp. 4 through 9.

*Primary Examiner*—Peter M. Cuomo
*Assistant Examiner*—Rodney B. White
*Attorney, Agent, or Firm*—Michael Best & Friedrich LLP

[57] ABSTRACT

A seat for use in an emergency vehicle includes a base portion and a seat back extending up from the base portion. The seat back includes a pair of vertical cushions spaced apart and positioned on opposite sides of a central recess that houses a self-contained breathing apparatus (SCBA). A lower end of each vertical cushion includes a removable insert and an upper end includes a retaining tab adapted to retain a shoulder strap of the SCBA. The base of the seat includes portions of reduced width along opposite edges of the base to provide clearance for a seat belt or seat tether. Attached to the seat back is a headrest frame having a curved top handle portion that facilitates inserting the SCBA into the recess, provides clearance for removal of the SCBA, and provides added structural stability to the seat. A pair of headrest members are pivotally attached to the headrest frame for movement about a pivot axis disposed at an acute angle with respect to vertical, such that the headrest members pivot outwardly and upwardly when the SCBA is removed from the recess.

18 Claims, 3 Drawing Sheets

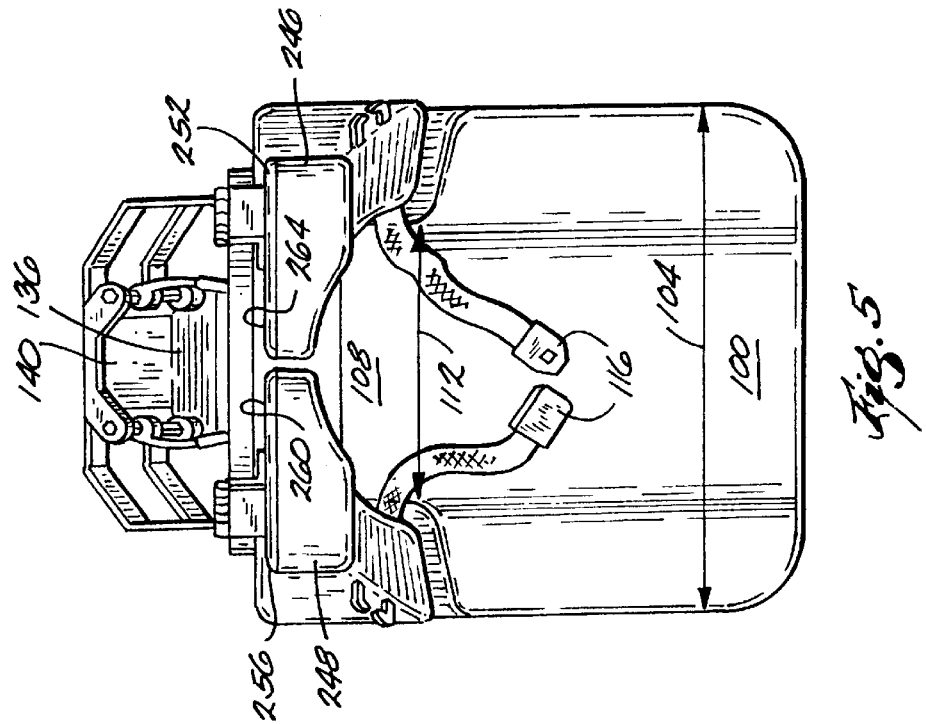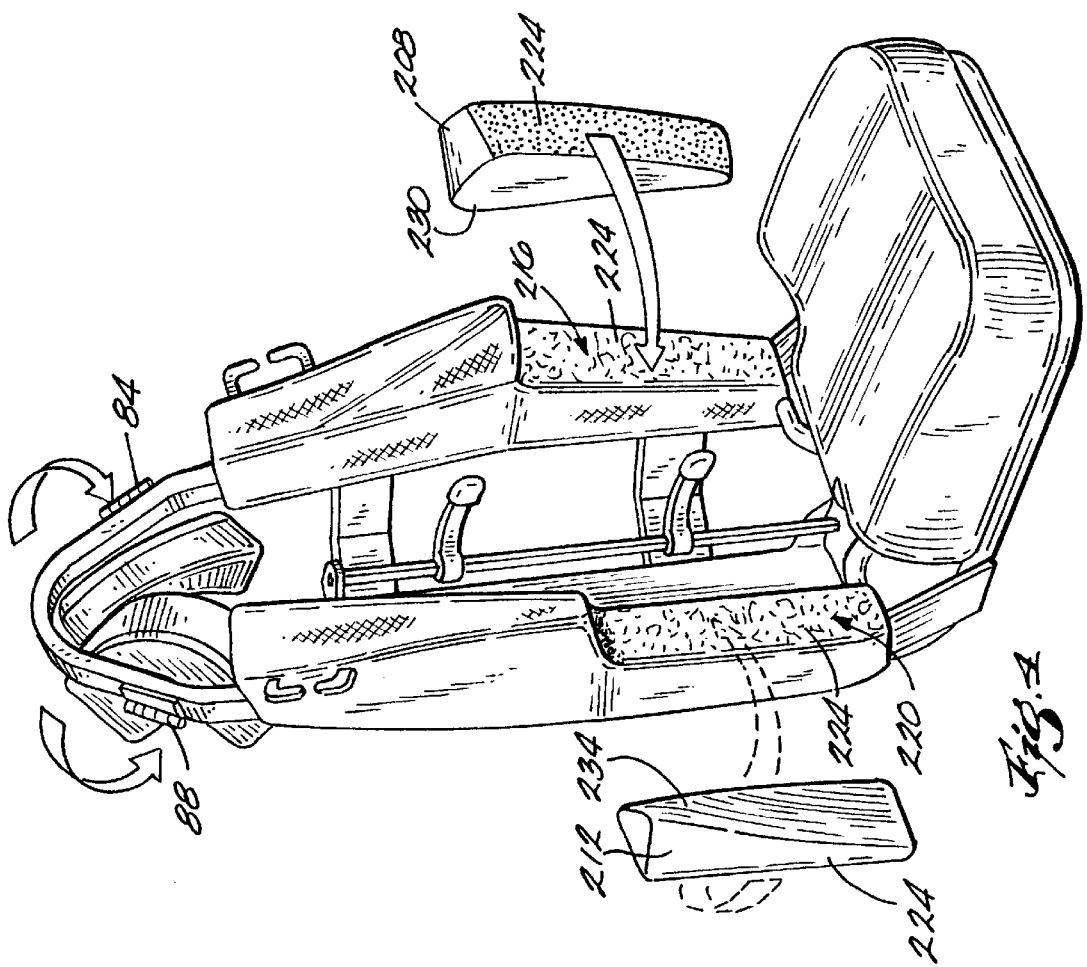

VEHICLE SEAT WITH REMOVABLE BOLSTERS AND PIVOTING HEADREST MEMBERS

BACKGROUND

The invention relates generally to vehicle seats and, more particularly, to vehicle seats of the type for use in emergency vehicles and for supporting a self-contained breathing apparatus (SCBA).

Typical prior art seats for use in an emergency vehicle and for supporting a self-contained breathing apparatus are disclosed in U.S. Pat. Nos. 5,213,392, 5,275,462, and 5,681,080.

SUMMARY

A seat for use in an emergency vehicle is provided that includes a base portion and a seat back extending up from the base portion. The seat back includes a pair of vertical cushions spaced apart and positioned on opposite sides of a central recess. Positioned within the recess is a support assembly for supporting a self-contained breathing apparatus (SCBA).

Each vertical cushion includes an upper end and a lower end. The lower end includes a removable insert or kidney bolster and the upper end includes a retaining tab adapted to releasably retain a shoulder strap of the SCBA. The lower end also includes a forwardly opening recess adapted to receive the removable insert.

The removable insert allows the seat to be adapted for use with SBCA assemblies having belts of different thickness and stiffness. The bolster insert is attached to the seat back in the forwardly opening recess for a person sitting in the seat with a SCBA having a relatively thin and flexible kidney belt, and is removed for a person sitting in the seat with a SCBA having a relatively thick and stiff kidney belt.

The retaining tabs on the upper ends of the vertical cushions hold the shoulder straps to the sides while the person sits in the seat, so that the person can easily put his or her arms through the straps while sitting, even when the person is wearing heavy clothing that restricts movement.

The base of the seat includes a cushion. A rear portion of the cushion has a reduced width with respect to a forward portion of the cushion to provide clearance for a seat belt or seat tether.

Attached to the seat back is a headrest frame having upwardly extending side portions and a curved top handle portion. A headrest member is pivotally attached to each of the side portions of the headrest frame for movement about a pivot axis between a headrest position and a pivoted retracted position. The side portions of the headrest frame and the pivot axes are angled with respect to vertical, thereby causing the headrest members to pivot upwardly and outwardly with respect to the seat.

This pivoting action creates a narrower seat profile that avoids interference with adjacent seats. The pivot angle also makes removal of the SCBA tank from the seat while the SCBA is strapped to a person's back easier and more natural than prior art seats.

The curved top handle portion of the headrest frame extends above the headrest members, and creates a handle to facilitate inserting the SCBA into the recess. The curved top handle portion also provides clearance for the SCBA when a person sitting in the seat with the SCBA strapped on attempts to exit the seat. Lastly, the curved top handle portion provides added structural stability to the seat.

BRIEF DESCRIPTION OF THE DRAWINGS

FIG. 4 is an exploded perspective view of the seat show in FIGS. 1–3 and with the bolsters removed and the headrest members in a retracted position.

FIG. 5 is a top view of the seat shown in FIG. 1.

DETAILED DESCRIPTION

Figure 1:
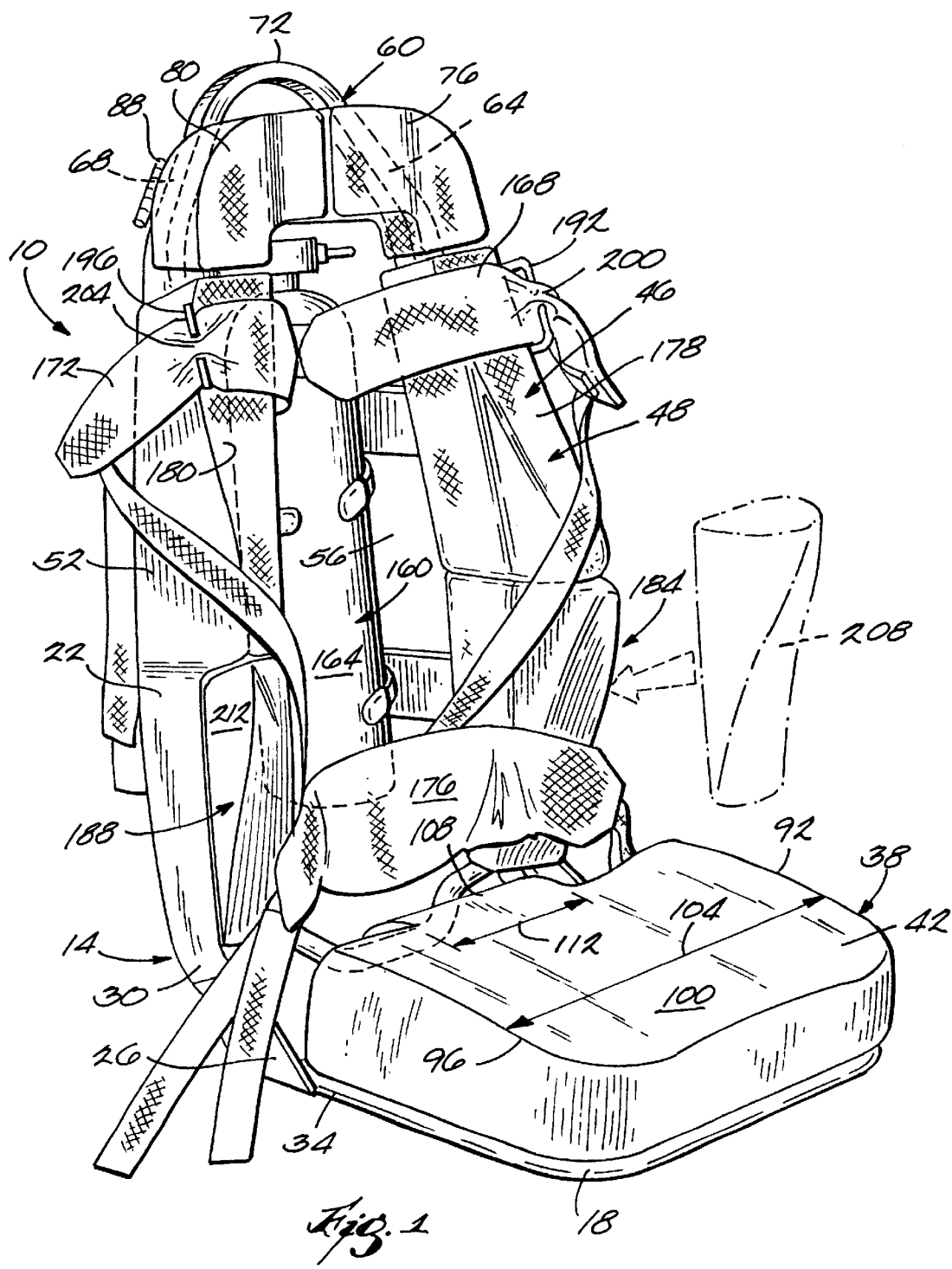
FIG. 1 is a perspective view of a seat according to the present invention.

FIG. 1 illustrates a seat 10 according to the present invention. The seat 10 includes a seat frame 14 having a generally horizontal portion 18 and a generally upright portion 22. A gusset 26 runs between a lower part 30 of the upright portion 22 and a rear part 34 of the horizontal portion 18 to provide extra stability. A base portion 38 having a seat cushion 42 is interconnected with the horizontal portion 18 of the seat frame 14, and a seat back 46 is attached to the upright portion 22 of the seat frame 14. The seat back 46 includes a pair of spaced-apart vertical cushions 48, 52 disposed on opposite sides of a recess 56.

Figure 2:
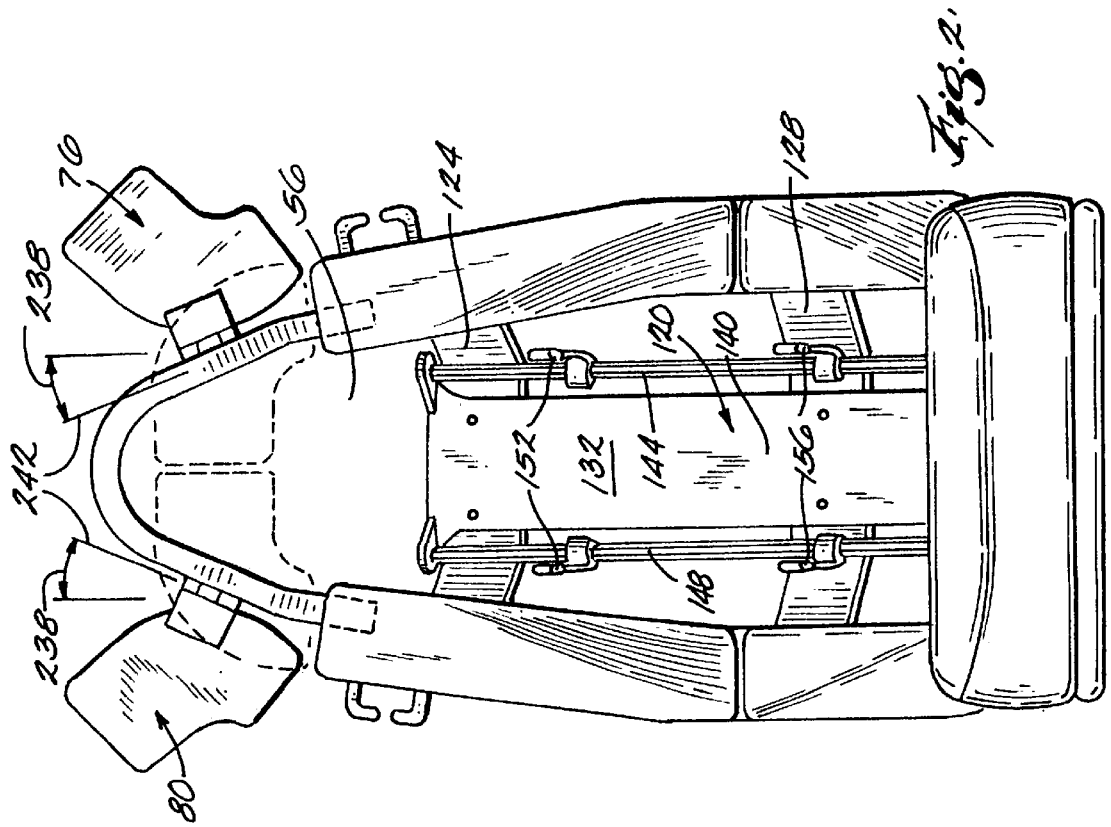
FIG. 2 is a front view of the seat shown in FIG. 1 and with the headrest members shown in a retracted position.

Referring now to FIG. 2, a headrest frame 60 having side portions 64, 68 and a handle portion 72 is interconnected with the upright portion 22 of the seat frame 14, and extends upwardly therefrom. A pair of headrest members 76, 20 are pivotally attached to the side portions 64, 68 of the headrest frame 60 by hinges 84, 98. The headrest members 76, 80 are preferably curved or quarter-circular in shape, but can be provided in virtually any shape.

FIGS. 4 and 5 best illustrate the base 38 of the seat 10. As illustrated, the seat cushion 42 has opposite side edges 92, 96, and includes a front portion 100 having a front portion width 104 and a rear portion 108 having a rear portion width 112 that is less than the front portion width 104. The rear portion 108 is centrally positioned with respect to the side edges 92, 96, thereby creating clearance for a seat belt 116 (shown only in FIG. 5) or a seat tether on both sides of the rear portion 108.

Figure 3:
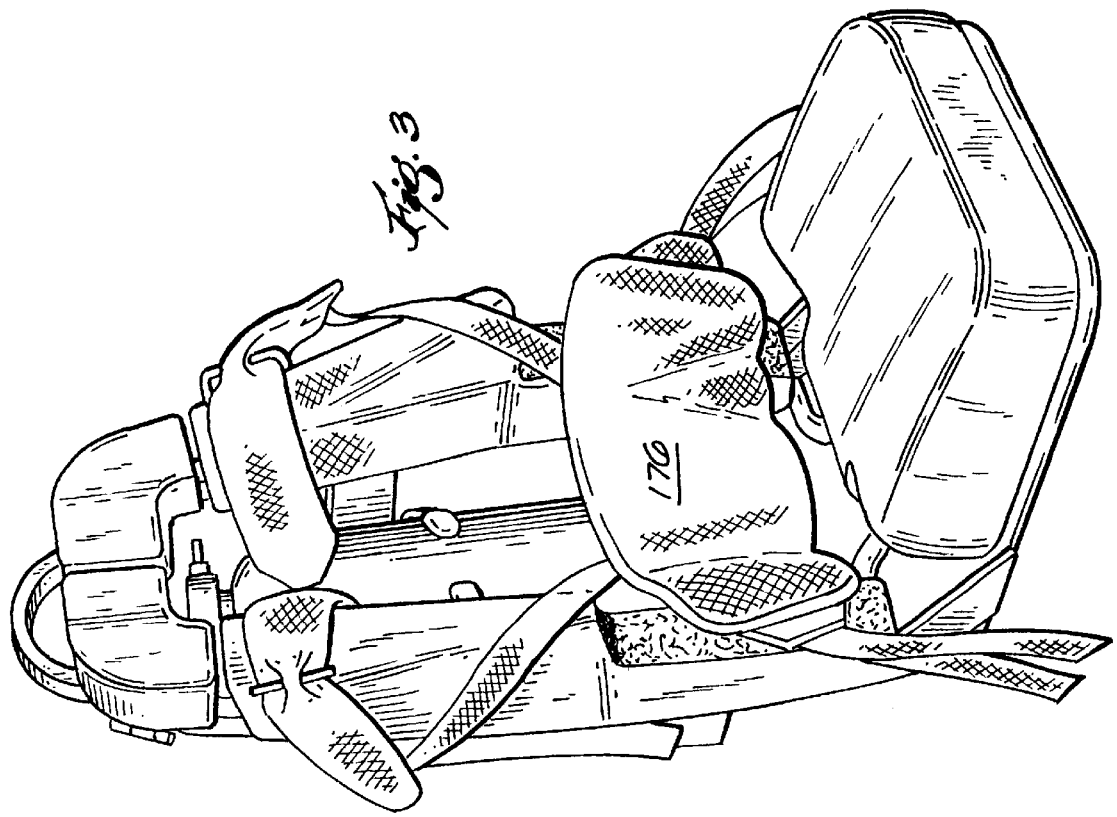
FIG. 3 is a perspective view of the seat shown in FIG. 1 and with the removable bolsters removed to house a SCBA with a large kidney belt.

Referring to FIGS. 2 and 5, a support assembly 120 is disposed within the recess 56. The support assembly 120 includes two generally horizontally disposed support brackets 124, 128 attached to the seat frame 14. A single support piece 132, preferably made of metal, is fastened or otherwise interconnected with the brackets 124, 128. The support piece 132 includes a generally horizontal support plate portion 136 and a generally vertical plate portion 140. A pair of vertical rods 144, 148 are pivotally interconnected with the support piece 132. Two pairs of restraining arms 152, 156 are rigidly attached to each of the rods 144, 148 and are pivotal therewith, As illustrated in FIGS. 1 and 3, a self-contained breathing apparatus (SCBA) 160 having a tank 164, a pair of shoulder straps 168, 172, and a kidney belt 176 is supported by the support assembly 120 within the recess 56. The shoulder straps 168, 172 and kidney belt 176 are attached to the tank 164, and may be strapped around a person while the person sits in the seat 10. To store the SCBA 160 in the recess 56 when not in use, the SCBA tank 164 is rested on the support plate portion 136 and against the vertical plate portion 140, and the rods 144, 148 are pivoted to cause the restraining arms 152, 156 to embrace the tank 164, thereby securely supporting and restraining the SCBA tank 164 within the recess 56.

As illustrated in FIG. 2, each vertical cushion 48, 52 includes an upper end 178, 180 and a lower end 184, 188. Each upper end 178, 180 includes a retaining tab 192, 196 that is generally C-shaped, and that includes an opening 200, 204. As seen in FIGS. 1 and 3, the tabs 192, 196 hold the shoulder straps 168, 172 of the SCBA 160 to the sides in a position easily accessible to a person sitting in the seat 10, even if the person is wearing heavy clothing that restricts movement. When the person has put his or her arms through the straps 168, 172, the retaining tabs 192, 196 release the straps 168, 172 through the opening 200, 204 in the "C." The tabs 192, 196 are preferably made of flexible plastic to further facilitate removal of the straps 168, 172, but the tabs 192, 196 may be made of any material that is strong and flexible enough to suit the purpose.

Each lower end 184, 188 includes a removable insert or kidney bolster 208, 212 as best shown in FIG. 4. The insert 208, 212 is attached to the lower end 184, 188 in a forwardly opening recess 216, 220 of the vertical cushion 48, 52. Attached to the vertical cushion 48, 52 and the insert 208, 212 is attachment means 224, such as a strip of Velcro or other suitable material. When the insert 208, 212 is positioned in the forwardly opening recess 216, 220 it forms a forward portion 230, 234 of the lower end 184, 188 of the vertical cushion 48, 52.

Depending on the size, thickness, and rigidity of the kidney belt 176, the inserts 208, 212 may be attached to the seat back 46 as seen in FIG. 1, or removed from the seat back 46 as seen in FIG. 3 to accommodate the SCBA 160. The SCBA 160 illustrated in FIG. 1 includes a relatively small kidney belt 176 that is flexible enough to extend our of the recess 56 and still conform to the person's waist while the person sits in the seat 10. The kidney belt 176 in FIG. 3 is significantly larger, thicker, and stiffer than that of FIG. 1. A SCBA 160 with the kidney belt 176 of FIG. 3 could not be installed in the support assembly 120 with the bolster inserts 208, 212 installed, as the kidney belt 176 would engage the bolster inserts 208, 212 and prevent proper positioning of the SCBA 160 in the recess 56.

Referring now to FIG. 2, the side portions 64, 68 of the headrest frame 60 extend upwardly at an acute angle 238 with respect to vertical, which in the preferred embodiment is 45°. Each headrest member 76, 80 is pivotally attached to the headrest frame 60 with the hinge 84, 88 as mentioned above, and therefore pivots about a pivot axis 242 disposed at an angle 238 equal to that of the side portion 64, 68. Each headrest member 76, 80 includes a cushion portion 246, 248 and a hard back portion 252, 256 having a rear-facing surface 260, 264 (see FIG. 5). The headrest members 76, 80 pivot about the pivot axes 242 from a headrest position (shown in FIGS. 1, 3, and 5) to a fully rotated or pivoted retracted position (shown in FIG. 4) when force is applied to the rear-facing surface 260, 264. In the retracted position, the headrest members 76, 80 are disposed behind the headrest frame 60 and above the SCBA support assembly 120.

As the headrest members 76, 80 are pivoted from the headrest position to the retracted position, the headrest members 76, 80 rotate through an intermediate retracted position (shown in FIG. 2) wherein the headrest members 76, 80 are at the widest point.

Because of the angles of the pivot axes, the headrest members 76, 80 rotate upwardly as well as outwardly, thereby reducing the clearance needed on the sides of the seat 10. This allows seats to be positioned closer together in the emergency vehicle and conserves space. Also because of the angles of the pivot axes, the headrest members 76, 80 are acted on by vertical as well as horizontal components of forces. This allows a person to move the headrest members 76, 80 out of the headrest position with the SCBA tank 164 by exiting the seat 10 in a normal or natural fashion, which includes leaning forward and standing up at substantially the same time.

The curved handle portion 72 of the headrest frame 60 connects the side portions 64, 68 of the headrest frame 72 and extends above the headrest members 76, 80. A person installing a SCBA tank 164 into the recess 56 can grasp the handle 72 while leaning forward with the SCBA 160. This relieves stress on the person's lower back and facilitates an easier, quicker insertion of the SCBA 160 into the SCBA support assembly 120. The curved handle portion 72 of the headrest frame 60 also provides clearance for exiting the seat 10 with the SCBA 160. Lastly, the curved handle portion 72 of the headrest frame 60 adds structural stability to the seat 10 by joining top portions of the side portions of the seat frame 14 together.

Although particular embodiments of the present invention have been shown and described, other alternative embodiments will be apparent to those skilled in the art and are within the intended scope of the present invention. Thus, the present invention is to be limited only by the following claims.

We claim:

1. A seat for use in an emergency vehicle, the seat comprising:
   a base; and
   a seat back extending up from the base, the seat back including
      a central recess housing a support assembly for supporting a self-contained breathing apparatus tank in the central recess, and
      a vertical cushion on each of opposite sides of the central recess, each vertical cushion having an upper end and a lower end including a bottom edge, the lower end defining a forwardly opening recess extending to said bottom edge, the lower end including a removable insert positionable in said forwardly opening recess to form a forward portion of the lower end.

2. The seat of claim 1, further comprising an attachment for removably securing the inserts to the seat back.

3. The seat of claim 2, wherein the attachment includes hook and loop fastener.

4. The seat of claim 1, further comprising a retaining tab interconnected with each of the vertical cushions for retaining a shoulder strap interconnected with the tank.

5. The seat of claim 1, wherein the base includes a front portion having a front portion width and a rear portion having a rear portion width that is smaller than the front portion width to provide clearance for a seat belt.

6. The seat of claim 5, wherein the base includes a pair of opposite sides, and wherein the rear portion is centrally located with respect to the opposite sides to create an equal amount of seat belt clearance on each of the opposite sides.

7. A seat for use in an emergency vehicle, the seat comprising:
   a seat base;
   a seat back projecting up from the seat base; and
   a pair of headrest members supported by the seat back for movement between a headrest position and a pivoted retracted position wherein the headrest members are moved to a position away from the headrest position, the headrest members being supported for pivotal movement upwardly and outwardly about a pivot axis defining an acute angle with respect to a vertical plane bisecting the seat.

8. The seat of claim 7, wherein said vertical plane is intersected at a point above the seat back by each pivot axis.

9. The seat of claim 7, wherein each pivot axis defines a 45° angle with respect to said vertical plane.

10. A seat for use in an emergency vehicle, the seat comprising:

a base;

a seat back extending upwardly from the base, the seat back including a top portion and a central recess;

a headrest member interconnected with said seat back;

a support assembly for supporting a self-contained breathing apparatus tank in the central recess; and a frame interconnected with the seat back, and extending upwardly from the top portion of the seat back and at least a portion of the frame forming a handle extending at least partially above said headrest member.

11. The seat of claim 10, wherein said headrest member includes a pair of headrest members supported on the frame for pivotal movement about a pivot axis defining an acute angle with respect to a vertical plane bisecting said seat.

12. The seat of claim 11, wherein each headrest member includes a cushion.

13. The seat of claim 11, wherein the acute angle is equal to 45°.

14. The seat of claim 11, wherein the headrest members are generally quarter-circular in shape.

15. The seat of claim 11, wherein each headrest member includes a rear-facing surface and is adapted to rotate about the pivot axis when force is applied to the rear-facing surface, and wherein rotation of the headrest members creates an opening in the seat back, the opening defined by the frame.

16. The seat of claim 15, wherein the force is applied by removal of the tank from the central recess.

17. The seat of claim 1, wherein said forwardly opening recesses are also downwardly opening recesses.

18. The seat of claim 1, wherein the thickness of said insert decreases from a top edge of said insert to a bottom edge thereof.

* * * * *